United States Patent [19]
Minevski

[11] Patent Number: 6,036,888
[45] Date of Patent: Mar. 14, 2000

[54] CORROSION INHIBITOR FOR ALKANOLAMINE UNITS

[75] Inventor: Ljiljana V. Minevski, The Woodlands, Tex.

[73] Assignee: BetzDearborn Inc., Trevose, Pa.

[21] Appl. No.: 08/920,275

[22] Filed: Aug. 22, 1997

[51] Int. Cl.[7] .............. C09K 3/00; C23F 11/00; C10G 1/18
[52] U.S. Cl. .............. 252/395; 252/392; 208/47; 208/48; 422/7
[58] Field of Search .................. 252/395, 392; 208/47, 48 A; 422/7

[56] References Cited

U.S. PATENT DOCUMENTS

| | | | |
|---|---|---|---|
| 2,377,966 | 6/1945 | Reed | 23/150 |
| 3,133,028 | 5/1964 | Kenhere | 252/389 |
| 3,345,381 | 10/1967 | Campbell | 260/329 |
| 4,100,100 | 7/1978 | Clouse et al. | 252/189 |
| 4,102,804 | 7/1978 | Clouse et al. | 252/189 |
| 4,250,046 | 2/1981 | Przybylinski | 252/49.3 |
| 4,370,256 | 1/1983 | Oakes | 252/391 |
| 4,430,196 | 2/1984 | Niu | 208/47 |
| 4,431,563 | 2/1984 | Krawcyzk et al. | 252/189 |
| 4,446,119 | 5/1984 | DuPart | 423/228 |
| 4,490,275 | 12/1984 | Niu | 252/189 |
| 4,541,946 | 9/1985 | Jones et al. | 252/189 |
| 4,595,723 | 6/1986 | Henson et al. | 524/398 |
| 4,596,849 | 6/1986 | Henson et al. | 524/398 |
| 4,737,166 | 4/1988 | Matson et al. | 55/16 |
| 4,777,307 | 10/1988 | Alward et al. | 585/2 |
| 5,312,459 | 5/1994 | Sprugal et al. | 44/334 |
| 5,314,672 | 5/1994 | Vasil | 423/228 |
| 5,347,003 | 9/1994 | Trauffer et al. | 544/8 |
| 5,531,937 | 7/1996 | Minevski | 252/394 |

*Primary Examiner*—C. H. Kelly
*Attorney, Agent, or Firm*—Steven D. Boyd

[57] ABSTRACT

The corrosion of metals in contact with aqueous alkanolamine solution in acid gas removal units is inhibited by adding to the alkanolamine solution a corrosion inhibiting amount of a sulfur containing heterocyclic ring compound. The ring compounds are useful for inhibiting the corrosion of metals in both the acid gas rich and the acid gas lean portions of the acid gas removal unit.

11 Claims, No Drawings

CORROSION INHIBITOR FOR ALKANOLAMINE UNITS

FIELD OF THE INVENTION

The present invention relates to methods of inhibiting corrosion in aqueous alkanolamine units and compositions for inhibiting corrosion in aqueous alkanolamine units. More particularly, the present invention relates to methods of inhibiting corrosion of metals in contact with aqueous alkanolamine solutions in acid gas removal amine units using heterocyclic sulfur compounds.

BACKGROUND OF THE INVENTION

The conditioning of naturally occurring liquid and gas streams by absorbing acid gases such as $CO_2$ and $H_2S$ in an absorbent solution is a well known commercial practice. Acid gas removal is commonly practiced in the oil refining, natural gas recovery, ammonia plant and wood pulp industries. For example, when crude oil and natural gas are removed from a formation they frequently contain $CO_2$ or $H_2S$ (acid gases). Acid gases are removed from the hydrocarbon in an acid gas removal amine system (amine unit). Amine units are typically constructed of carbon steel and operate at temperatures of from about 110° to about 300° F., at pressures of from about 10 to about 500 psig and with less than about 10 ppm of oxygen present as an undesirable contaminant in the aqueous alkanolamine solution. An amine unit utilizes an alkanolamine such as monoethanolamine (MEA), diethanolamine (DEA), methyldiethanolamine (MDEA), diisopropylamine (DIPA), and diglycolamine (DGA) in an aqueous solution. The hydrocarbon containing acid gases are contacted with the aqueous amine solution in a tray or packed absorber where the amine reacts with the acid gases thereby removing them from the hydrocarbon and forming an aqueous amine solution containing the absorbed acid gases (rich stream). The amine-acid gas reaction is later reversed in a plate or packed stripper resulting in an acid gas stream and a reusable aqueous amine solution (lean stream).

Amine units present a variety of corrosion control problems. Unreacted carbon dioxide dissolved in the aqueous alkanolamine solution forms acid species which are corrosive to metals. Oxygen can enter an amine unit through storage tanks, sumps, surge vessels, and the like and attack metals causing corrosion. Oxygen also can oxidize the alkanolamine. Oxidation and degradation products of alkanolamines can cause metal corrosion. Efforts to control corrosion in amine units usually focus on the use of metallurgy, minimization of acid gas flashing, filtration, stress relieving, process controls and corrosion inhibitors such as metal passivating agents. However, environmental and safety concerns have limited the practicality of using some materials such as nickel, cobalt, calcium, copper, chromium, zinc, tin, aluminum, magnesium and cyano compounds and the like as corrosion inhibiting agents. Since corrosion, if left untreated, can cause shut-down of an amine unit, corrosion control is a very important consideration. In addition, most corrosion control efforts have focused on treating the rich stream of the amine unit. However, the lean sections of amine units also experience corrosion.

Therefore, a need exists for compositions which when added to an aqueous alkanolamine solution in an acid gas removal amine unit inhibits corrosion of metals in contact with the aqueous alkanolamine solutions and which are effective for inhibiting corrosion in both the rich and lean portions of the amine unit.

Accordingly, it is an object of the present invention to provide compounds for inhibiting corrosion of metals in contact with aqueous alkanolamine solutions.

It is also an object of this invention to provide compounds which are effective for inhibiting metal corrosion in both the rich and lean portions of amine units containing aqueous alkanolamine solutions.

It is an additional object of the present invention to provide aqueous acid gas removal solutions for use in amine units which are inhibited against acid gas promoted corrosion of metals.

It is yet another object of this invention to provide a method for inhibiting corrosion of metals in contact with aqueous alkanolamine solutions in amine acid gas removal units.

PRIOR ART

U.S. Pat. No. 3,133,028 to Kenhere discloses that corrosion of metals in contact with water can be inhibited by the use of water-soluble hexavalent chromium compounds in conjunction with water-soluble thiocyanates, and/or water soluble thiourea compounds of the type represented by the formula:

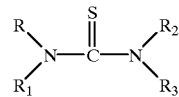

where R, $R_1$, $R_2$ and $R_3$ are selected from the group consisting of hydrogen, alkali metal, and alkyl radicals containing from 1 to 4 carbon atoms. Zinc compounds are also disclosed as corrosion inhibiting compounds when used in conjunction with water-soluble hexavalent chromium.

U.S. Pat. No. 4,100,100 to Clouse et al. discloses the corrosion of iron and steel by an aqueous sour gas conditioning solution to remove $CO_2$ from a gas stream is inhibited by a combination of a quaternary pyridinium salt and an organic thioamide or water-soluble thiocyanate and a water-soluble cobalt salt. The patent discloses that the cobalt compound, the thio compound or the pyridinium salt alone will provide no inhibition or only partial inhibition.

U.S. Pat. No. 4,102,804 to Clouse et al. discloses the corrosion of iron and steel in an aqueous sour gas conditioning system is inhibited by a combination of a quaternary pyridinium salt and an organic thioamide, a water-soluble sulfide or a water-soluble thiocyanate. The patent also discloses that either the thio compound or the pyridinium salt alone will provide no inhibition or only partial inhibition.

U.S. Pat. No. 4,446,119 to DuPont et al. discloses a corrosion inhibited composition containing a gas conditioning solution such as an alkanolamine with water or with organic solvents and with soluble thiocyanate compounds, soluble trivalent bismuth compounds with or without soluble divalent nickel or cobalt compounds.

U.S. Pat. No. 4,431,563 to Krawcyzk et al. discloses that corrosion of ferrous metals in gas conditioning apparatus is inhibited by using a gas conditioning solution such as aqueous alkanolamines which contain thionitrogen compounds such as metal thiocyanates or thioamides. The patent discloses that metals such as cobalt, nickel, calcium, copper, chromium, zinc, tin, aluminum and magnesium will dissolve from the equipment after a few days of recycling the gas conditioning solution or these metals may be introduced into the gas conditioning solution as additives. The metals in the gas conditioning solution act as a synergist with the thionitrogen compounds to inhibit metal corrosion in the gas conditioning apparatus.

U.S. Pat. No. 4,541,946 to Jones et al. discloses a corrosion inhibitor composition useful for preventing corrosion by solvents used in treating sour gas streams comprising a quaternary pyridinium salt, a surface-active and/or a thio compound and a water soluble nickel compound. The thio compound can be an organic thioamide or preferably a water-soluble thiocyanate. The patent also discloses that the nickel compound, the thio compound, the surface-active compound or the pyridinium salt, when used alone, provide little or no corrosion inhibition.

U.S. Pat. No. 4,595,723 to Henson et al. discloses a thiourea—amine-formaldehyde based polymer used in combination with a nickel (II) ion for inhibiting corrosion of ferrous metals and its alloys in gas conditioning service using aqueous monoethanolamine to scrub carbon dioxide.

U.S. Pat. No. 4,596,849 to Henson et al. discloses a thiourea—amine-formaldehyde based polymer used in combination with a copper (II) ion for inhibiting corrosion of ferrous metals and its alloys in gas conditioning service using aqueous monoethanolamine to scrub carbon dioxide containing oxygen.

U.S. Pat. No. 5,531,937 to Minevski et al. discloses non-sulfur based compositions comprising water soluble n-alkyl morpholine, saturated dicarboxylic acid and optionally alkanolamine and optionally surfactants for inhibition of ferrous metal corrosion in oxygen-free solutions.

SUMMARY OF THE INVENTION

To achieve the foregoing objects, the present invention provides compositions for inhibiting corrosion of metals in contact with aqueous alkanolamine solutions. The compositions are heterocyclic ring compounds selected from the group consisting of thiomorpholines, dithianes and thioxanes wherein the carbon members of the thiomorpholines, dithianes, and thioxanes each have independently H, $C_1$ to $C_8$ alkyl, $C_7$ to $C_{12}$ alkaryl, $C_6$ to $C_{10}$ aryl, and/or $C_3$ to $C_{10}$ cycloalkyl group substituents.

The invention also provides aqueous acid gas removal solutions inhibited against acid gas promoted corrosion of metals. The solutions are comprised of an alkanolamine, a heterocyclic ring compound selected from the group consisting of thiomorpholines, dithianes, and thioxanes wherein the carbon members of the thiomorpholines, dithianes, and thioxanes each have independently H, $C_1$ to $C_8$ alkyl, $C_7$ to $C_{12}$ alkaryl, $C_6$ to $C_{10}$ aryl, and/or $C_3$ to $C_{10}$ cycloalkyl group substituents, and mixtures thereof in water.

The invention further provides a method for inhibiting corrosion of metals in contact with aqueous alkanolamine solutions. The method comprises adding an amount of sulfur containing heterocyclic ring compounds to an aqueous alkanolamine solution, sufficient to establish a concentration of the sulfur containing heterocyclic ring compounds in the aqueous solution which is effective for the purpose of inhibiting metal corrosion in an amine acid gas removal unit.

DETAILED DESCRIPTION OF THE INVENTION

In accordance with the present invention, a composition and method for inhibiting corrosion of metals in aqueous alkanolamine solutions is provided. The present inventors have discovered that a corrosion inhibitor comprising one or more heterocyclic ring compounds containing sulfur, when added to an aqueous alkanolamine solution, significantly inhibits corrosion of metals in contact with the alkanolamine solution. In addition, the inventors have discovered that heterocyclic ring compounds containing sulfur are effective for inhibiting metal corrosion in both the rich and lean portions of aqueous alkanolamine unit acid gas removal equipment. The sulfur containing heterocyclic ring compounds are thiomorpholines, dithianes, thioxanes and mixtures thereof which have the general structure:

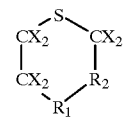

where $R_1$ is O, NH, S or $CX_2$ and $R_2$ is S or $CX_2$, and X is independently H, $C_1$ to $C_8$ alkyl, $C_7$ to $C_{12}$ alkaryl, $C_8$ to $C_{10}$ aryl, and/or $C_3$ to $C_{10}$ cycloalkyl, with the proviso that when $R_2$ is S, $R_1$ must be $CX_2$ and when $R_1$ is O, N or S, $R_2$ must be $CX_2$.

The inventors believe that 2-cyclohexyl-1,3-dithiane; 2-phenyl-1,3-dithiane; 2-methyl-1,3-dithiane; 2-ethyl-1,3-dithiane; 2-(2'-methylbutyl)-1,3-dithiane; 2-benzyl-1,3-dithiane; 2,2-diphenyl-1,3-dithiane; 2,2-dimethyl-1,3-dithiane; 4-methyl-1,3-dithiane; 5-ethyl-1,3-dithiane; 2-cyclohexyl-1,3-thioxane; 2-phenyl-1,3-thioxane; 2-methyl-1,3-thioxane; 2-ethyl-1,3-thioxane; 2-(2'-methylbutyl)-1,3-thioxane; 2-benzyl-1,3-thioxane; 2,2-diphenyl-1,3-thioxane; 2,2-dimethyl-1,3-thioxane; 4-methyl-1,3-thioxane; 5-ethyl-1,3-thioxane; 6-propyl-1,3-thioxane; 2-methyl-1,4-thioxane; 2-ethyl-1,4-thioxane; 2,5-di-n-butyl-1,4-thioxane; 2,6-di-n-hexyl-1,4-thioxane; 2-benzyl-1,4-thioxane; 3-cyclohexyl-1,4-thioxane; 2-methyl-1,4-dithiane; 2-ethyl-1,4-dithiane; 2,5-di-n-butyl-1,4-dithiane; 2,6-di-n-hexyl-1,4-dithiane; 2-benzyl-1,4-dithiane; 3-cyclohexyl-1,4-dithiane; thiomorpholine; 2-methylthiomorpholine; 3-ethylthiomorpholine; 4-ethylthiomorpholine; and 2,6-dibenzylthiomorpholine would be effective for the practice of this invention.

The preferred heterocyclic ring compounds for the practice of this invention are thiomorpholine ($C_4NSH_9$); 1,4-dithiane ($C_4S_2H_8$); 1,3-dithane ($C_4S_2H_8$) and 1,4-thioxane ($C_4SOH_8$).

The heterocyclic ring compounds of this invention can be added neat to the alkanolamine solution in an amine unit or can be added diluted with water, a cyclic acid such as phthalic acid, and/or with an alkanolamine solution. Preferably, the alkanedithiol is added diluted in an aqueous phthalic acid solution.

The sulfur containing heterocyclic ring compounds of this invention are also effective for inhibiting corrosion in aqueous alkanolamine solutions substantially free of materials such as passivating agents including nickel, cobalt, calcium, copper, chromium, zinc, tin, aluminum, magnesium and cyano compounds. As used herein, "substantially free of" means that less than about 5 ppm of a material is present in the aqueous alkanolamine solution as an undesirable contaminant.

The amount of sulfur containing heterocyclic ring compound which will be added to an amine unit to inhibit corrosion will vary depending on the operating conditions of each amine unit. However, it is expected that from about 5 to about 2500 parts sulfur containing heterocyclic ring compound per million parts aqueous alkanolamine solution (ppm) will be effective to inhibit corrosion of metals in contact with an aqueous alkanolamine solution within an amine unit. The preferred treatment level of sulfur containing heterocyclic ring compound added to an aqueous alkanolamine solution in an amine unit to inhibit corrosion is from about 200 to about 2250 ppm and the most preferred treatment level is from about 500 ppm to about 2000 ppm.

On a weight percent basis, the corrosion inhibited alkanolamine solution is comprised of about 15 to 75 weight percent alkanolamine, about 25 to 85 weight percent water and less than about 1 weight percent sulfur containing heterocyclic ring compound with the proviso that the sum of the weight percentages equals 100 weight percent.

In order to show the efficacy of inhibiting corrosion of metals in contact with aqueous alkanolamine solutions, various tests were performed. The results are presented herein for purposes of illustration and not limitation.

EXAMPLE I

A standard three electrode system was used to evaluate the corrosion inhibiting effect of various amounts of the invention corrosion inhibitor on metal in contact with an aqueous alkanolamine solution.

Test conditions simulated conditions in the lean portions of an amine unit by using an alkanolamine which had been purged with argon. Rich portions of an amine unit were simulated by using an alkanolamine purged with $CO_2$ or a mixture of alkanolamine and $Na_2S$ purged with $CO_2$.

Mild steel 1018 electrodes in the form of a disk were used as the metal simulating the metal in amine unit equipment. The temperature ranged from about 150° F. to 260° F. Gases were either purged continuously through the solution in the electrochemical glass cell or 20–80 psi of $CO_2$ pressure was applied in an autoclave.

TABLE I

Composition of Coded Corrosion Inhibitor Formulations

| | Composition in wt % | | |
|---|---|---|---|
| Code | Water | Thiomorpholine | Phthalic Acid |
| A | 50 | 25 | 25 |
| B | 75 | 25 | 0 |
| C | 61.5 | 13.5 | 25 |

The results are shown in Table II as inhibition measurements after 16 hours.

TABLE II

Inhibition From Electrochemical Measurements
% Protection at Temperature 190 F in MEA* Fluid

| Treatment Concentration | Lean System | | | Rich System | | |
|---|---|---|---|---|---|---|
| (ppm) | A | B | C | A | B | C |
| 500 | 67 | / | / | 56 | / | / |
| 500 | / | / | / | 55 | / | / |
| 1000 | 42 | 33 | 50 | 89 | 69 | 74 |
| 1000 | / | / | / | 89 | / | 92 |
| 2000 | / | / | 45 | / | / | 88 |
| 2000 | / | / | / | / | / | 77 | where / indicates the test was not conducted and where MEA* was 18 weight percent monoethanolamine containing 140 ppm sulfuric acid, 150 ppm oxalic acid, 140 ppm acetic acid, 240 ppm formic acid and 30 ppm sodium chloride in water.

Table II demonstrates that sulfur containing heterocyclic ring compounds, when added to an aqueous alkanolamine solution, inhibit acid gas induced corrosion of metals in contact with the aqueous alkanolamine solution.

Thus, the present invention provides sulfur containing heterocyclic ring compounds effective for inhibiting corrosion of metals in contact with aqueous alkanolamine solutions.

The invention also provides aqueous acid gas removal solutions inhibited against acid gas promoted corrosion of metals. The solutions are comprised of an alkanolamine, at least one sulfur containing heterocyclic ring compound and water.

The invention further provides a method for inhibiting corrosion of metals in contact with aqueous alkanolamine solutions. The method comprises adding an amount of sulfur containing heterocyclic ring compound, to an aqueous alkanolamine solution, sufficient to establish a concentration of the compound in the aqueous alkanolamine solution which is effective for the purpose of inhibiting metal corrosion. The sulfur containing heterocyclic ring compound is effective for inhibiting metal corrosion in both the rich and lean portions of an amine acid gas removal unit.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method for inhibiting corrosion of metals in contact with an aqueous alkanolamine solution comprising adding to the aqueous alkanolamine solution an effective corrosion inhibiting amount of a sulfur containing heterocyclic ring compound effective as a corrosion inhibitor and having the structure:

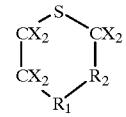

where $R_1$ is O, NH, S or $CX_2$ and $R_2$ is S or $CX_2$, and X is independently H, $C_1$ to $C_8$ alkyl, $C_7$ to $C_{12}$ alkaryl, $C_8$ to $C_{10}$ aryl, or $C_3$ to $C_{10}$ cycloalkyl, with the proviso that when $R_2$ is S, $R_1$ must be $CX_2$ and when $R_1$ is O, N or S, $R_2$ must be $CX_2$.

2. The method of claim 1 wherein said sulfur containing heterocyclic ring compound is a thiomorpholine, a dithiane or a thioxane.

3. The method of claim 1 wherein said sulfur containing heterocyclic ring compound is selected from the group consisting of 2-cyclohexyl-1,3-dithiane; 2-phenyl-1,3-dithiane; 2-methyl-1,3-dithiane; 2-ethyl-1,3-dithiane; 2-(2'-methylbutyl)-1,3-dithiane; 2-benzyl-1,3-dithiane; 2,2-diphenyl-1,3-dithiane; 2,2-dimethyl-1,3-dithiane; 4-methyl-1,3-dithiane; 5-ethyl-1,3-dithiane; 2-cyclohexyl-1,3-thioxane; 2-phenyl-1,3-thioxane; 2-methyl-1,3-thioxane; 2-ethyl-1,3-thioxane; 2-(2'-methylbutyl)-1,3-thioxane; 2-benzyl-1,3-thioxane; 2,2-diphenyl-1,3-thioxane; 2,2-dimethyl-1,3-thioxane; 4-methyl-1,3-thioxane; 5-ethyl-1,3-thioxane; 6-propyl-1,3-thioxane; 2-methyl-1,4-thioxane; 2-ethyl-1,4-thioxane; 2,5-di-n-butyl-1,4-thioxane; 2,6-di-n-hexyl-1,4-thioxane; 2-benzyl-1,4-thioxane; 3-cyclohexyl-1,4-thioxane; 2-methyl-1,4-dithiane; 2-ethyl-1,4-dithiane; 2,5-di-n-butyl-1,4-dithiane; 2,6-di-n-hexyl-1,4-dithiane; 2-benzyl-1,4-dithiane; 3-cyclohexyl-1,4-dithiane;

2-methylthiomorpholine; 3-ethylthiomorpholine; 4-ethylthiomorpholine; 2,6-dibenzylthiomorpholine; thiomorpholine; 1,4-dithiane; 1,3-dithane and 1,4-thioxane.

4. The method of claim 1 wherein said sulfur containing heterocyclic ring compound is thiomorpholine, 1,4-dithiane; 1,3-dithane or 1,4-thioxane.

5. The method of claim 1 wherein said aqueous alkanolamine solution contains dissolved acid gases.

6. The method of claim 1 wherein said effective corrosion inhibiting amount is from about 5 ppm to about 2500 ppm of said sulfur containing heterocyclic ring compound in said aqueous alkanolamine solution.

7. A method for inhibiting corrosion of metals in contact with an aqueous alkanolamine solution in the lean portions of acid gas removal equipment, comprising adding to said aqueous alkanolamine solutions a corrosion inhibiting amount of a sulfur containing heterocyclic ring compound effective as a corrosion inhibitor and having the structure:

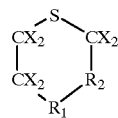

where $R_1$ is O, NH, S or $CX_2$ and $R_2$ is S or $CX_2$, and X is independently H, $C_1$ to $C_8$ alkyl, $C_7$ to $C_{12}$ alkaryl, $C_6$ to $C_{10}$ aryl, or $C_3$ to $C_{10}$ cycloalkyl, with the proviso that when $R_2$ is S, $R_1$ must be $CX_2$ and when $R_1$ is O, N or S, $R_2$ must be $CX_2$.

8. The method of claim 7 wherein said sulfur containing heterocyclic ring compound is a thiomorpholine, a dithiane or a thioxane.

9. The method of claim 7 wherein said sulfur containing heterocyclic ring compound is selected from the group consisting of 2-cyclohexyl-1,3-dithiane; 2-phenyl-1,3-dithiane; 2-methyl-1,3-dithiane; 2-ethyl-1,3-dithiane; 2-(2'-methylbutyl)-1,3-dithiane; 2-benzyl-1,3-dithiane; 2,2-diphenyl-1,3-dithiane; 2,2-dimethyl-1,3-dithiane; 4-methyl-1,3-dithiane; 5-ethyl-1,3-dithiane; 2-cyclohexyl-1,3-thioxane; 2-phenyl-1,3-thioxane; 2-methyl-1,3-thioxane; 2-ethyl-1,3-thioxane; 2-(2'-methylbutyl)-1,3-thioxane; 2-benzyl-1,3-thioxane; 2,2-diphenyl-1,3-thioxane; 2,2-dimethyl-1,3-thioxane; 4-methyl-1,3-thioxane; 5-ethyl-1,3-thioxane; 6-propyl-1,3-thioxane; 2-methyl-1,4-thioxane; 2-ethyl-1,4-thioxane; 2,5-di-n-butyl-1,4-thioxane; 2,6-di-n-hexyl-1,4-thioxane; 2-benzyl-1,4-thioxane; 3-cyclohexyl-1,4-thioxane; 2-methyl-1,4-dithiane; 2-ethyl-1,4-dithiane; 2,5-di-n-butyl-1,4-dithiane; 2,6-di-n-hexyl-1,4-dithiane; 2-benzyl-1,4-dithiane; 3-cyclohexyl-1,4-dithiane; thiomorpholine; 2-methylthiomorpholine; 3-ethylthiomorpholine; 4-ethylthiomorpholine; 2,6-dibenzylthiomorpholine; 1,4-dithiane; 1,3-dithane and 1,4-thioxane.

10. The method of claim 7 wherein said sulfur containing heterocyclic ring compound is thiomorpholine; 1,4-dithiane; 1,3-dithane or 1,4-thioxane.

11. The method of claim 7 wherein said effective corrosion inhibiting amount is from about 5 to about 2500 ppm of said sulfur containing heterocyclic ring compound in said aqueous alkanolamine solution.

* * * * *